(12) United States Patent
Taylor et al.

(10) Patent No.: US 10,124,961 B2
(45) Date of Patent: Nov. 13, 2018

(54) SLIP CONVEYOR

(71) Applicant: TNA Australia Pty Limited, Lidcombe (AU)

(72) Inventors: Ellis John Taylor, Lidcombe (AU); Luigi Di Palma, Lidcombe (AU)

(73) Assignee: TNA Australia Pty Limited, Lidcombe, New South Wales (AU)

( * ) Notice: Subject to any disclaimer, the term of this patent is extended or adjusted under 35 U.S.C. 154(b) by 5 days.

(21) Appl. No.: 15/209,609

(22) Filed: Jul. 13, 2016

(65) Prior Publication Data
US 2017/0057749 A1 Mar. 2, 2017

(30) Foreign Application Priority Data
Jul. 20, 2015 (AU) ................ 2015902859

(51) Int. Cl.
B65G 47/00 (2006.01)
B65G 25/04 (2006.01)
B65G 47/72 (2006.01)

(52) U.S. Cl.
CPC ............. B65G 25/04 (2013.01); B65G 47/72 (2013.01)

(58) Field of Classification Search
CPC .................................................... B65G 25/04
USPC ........ 198/360, 370.01, 750.1, 750.14, 750.2, 198/758
See application file for complete search history.

(56) References Cited

U.S. PATENT DOCUMENTS

| 3,380,572 | A | 4/1968 | Luger |
| 6,119,849 | A | 9/2000 | Svejkovsky et al. |
| 6,164,436 | A | 12/2000 | Taylor |
| 6,378,688 | B1* | 4/2002 | Fitzgerald ............. B65G 27/04 198/360 |
| 6,955,256 | B2 | 10/2005 | Tsoukalas et al. |
| 7,185,754 | B2 | 3/2007 | Taylor et al. |
| 7,228,957 | B1 | 6/2007 | Taylor et al. |
| 8,561,788 | B2 | 10/2013 | Knodell, Jr. et al. |
| 8,727,104 | B2 | 5/2014 | Taylor |
| 8,857,601 | B2 | 10/2014 | Taylor et al. |
| 2013/0313078 | A1 | 11/2013 | Taylor |
| 2015/0239677 | A1 | 8/2015 | Svejkovsky et al. |

FOREIGN PATENT DOCUMENTS

| GB | 743394 A | 1/1956 |
| GB | 895025 A | 4/1962 |
| JP | 2008-19075 A | 1/2008 |
| WO | 2015/183519 A1 | 12/2015 |

OTHER PUBLICATIONS

Search Report from corresponding British Patent Application GB1612502.3, dated Dec. 6, 2016 (four pages).
Search Report from corresponding Spanish Application No. 201630982 dated Mar. 13, 2017 (four pages).

* cited by examiner

*Primary Examiner* — Gene O Crawford
*Assistant Examiner* — Lester Ill Rushin
(74) *Attorney, Agent, or Firm* — Kilpatrick Townsend & Stockton LLP

(57) ABSTRACT

A slip conveyor (10) including a plurality of conveyor trays (11) that convey product (34) in the downstream direction (12). Each tray (11) is of a tubular construction and has at least one aperture (20) through which product is delivered upon angular movement of the tray (11) about its longitudinal axis.

24 Claims, 5 Drawing Sheets

SLIP CONVEYOR

CROSS-REFERENCE TO RELATED APPLICATIONS

This application claims the benefit of priority of Australian Application No. 2015902859, filed Jul. 20, 2015, the disclosure of which is herein incorporated by reference.

FIELD

The present invention relates to slip conveyors, also known as linear conveyors, and more particularly but not exclusively to slip conveyors employed in the packaging of food.

BACKGROUND

Conveyors, including slip conveyors are described in U.S. Pat. Nos. 6,164,436, 6,955,256, 7,185,754, 8,857,601, 7,228,957 and 8,727,104, as well as U.S. application Ser. No. 13/846848.

The slip conveyors described in the above listed USA patent cases have various means by which product is delivered from the conveyor to further conveyors or machinery located beneath the conveyors. The mechanisms are reasonably complex. Accordingly, they suffer from the disadvantages that they are expensive and difficult to service and clean.

Described in U.S. Pat. Nos. 6,119,849, 6,378,688 and 8,561,788 are linear (slip) conveyors in which the trays are reciprocated longitudinally, and are provided at their downstream end with a gate that is operable to deliver product from the tray. The trays are merely reciprocated longitudinally, with gates rotated between a conveying position at which product is conveyed from one tray to the next tray via the gate assembly, and a second position at which product delivered to the gate is allowed to fall through the gate for delivery to the machinery or conveyor below.

The linear conveyors of the above three USA patents suffer from the disadvantage that they are complex. This makes them expensive to manufacture and difficult to service. They are also difficult to clean.

OBJECT

It is the object of the present invention to overcome or substantially ameliorate at least one of the above disadvantages.

SUMMARY OF INVENTION

There is disclosed herein a slip conveyor including:
a conveyor tray, the tray being longitudinally elongated and having a receiving portion that receive product that is to be conveyed longitudinally of the tray to a delivery portion from which product is delivered from the tray, the tray also having a longitudinal axis about which the tray moves angularly;
a drive assembly to cause longitudinal reciprocation of the tray to cause product to move longitudinally of the tray from the receiving portion downstream towards the delivery portion, and to move the tray angularly about the longitudinal axis; and wherein
the tray has a longitudinally extending base that extends from the receiving portion to the delivery portion along which the product is moved when the tray is in a first angular position, and at least one longitudinally extending side wall extending from the receiving portion to a second delivery portion from which at least some product can be delivered from the conveyor when the tray is in a second angular position spaced about said longitudinal axis from the first angular position, the second delivery portion being spaced from the receiving portion by a length less than the first delivery portion is spaced from the receiving portion.

Preferably, said first delivery portion is an end extremity of said tray.

Preferably, said receiving portion is an end extremity of the tray.

Preferably, said second delivery portion is an aperture.

Preferably, said aperture is located adjacent but upstream of the said end first delivery portion.

Preferably, said aperture is a first aperture, and said tray includes a second aperture intermediate the delivery portion and the first receiving portion, and spaced from the first aperture toward said receiving portion.

Preferably, said one longitudinally extending side wall is a first side wall, and said tray includes a second longitudinally extending side wall, with the base located between the side walls so that the side walls and base provide a longitudinally extending trough along which the product moves.

Preferably, said tray is tubular in configuration.

Preferably, at least portion of said tray is circular in transverse cross-section.

Preferably, the conveyor includes a base upon which the tray is mounted via the drive assembly.

Preferably, the drive assembly includes a first motor, the first motor being mounted on the base and is connected to the tray to cause longitudinal reciprocation of the tray to convey product along the tray.

Preferably, the drive assembly includes a second motor, the second motor being mounted on the base and operatively associated with the tray to cause the angular movement of the tray.

Preferably, the conveyor includes guides mounted on the base and along which the tray moves to provide for the longitudinal reciprocation of the tray.

Preferably, the conveyor includes at least one ring attached to the tray and through which the tray passes, with the conveyor further including a mounting movably mounted on the guides, and engaged with the ring to provide for angular movement of the tray about said axis.

BRIEF DESCRIPTION OF DRAWINGS

Preferred forms of the present invention will now be described by way of example with reference to the accompanying drawings wherein.

DESCRIPTION OF EMBODIMENTS

Figure 1:
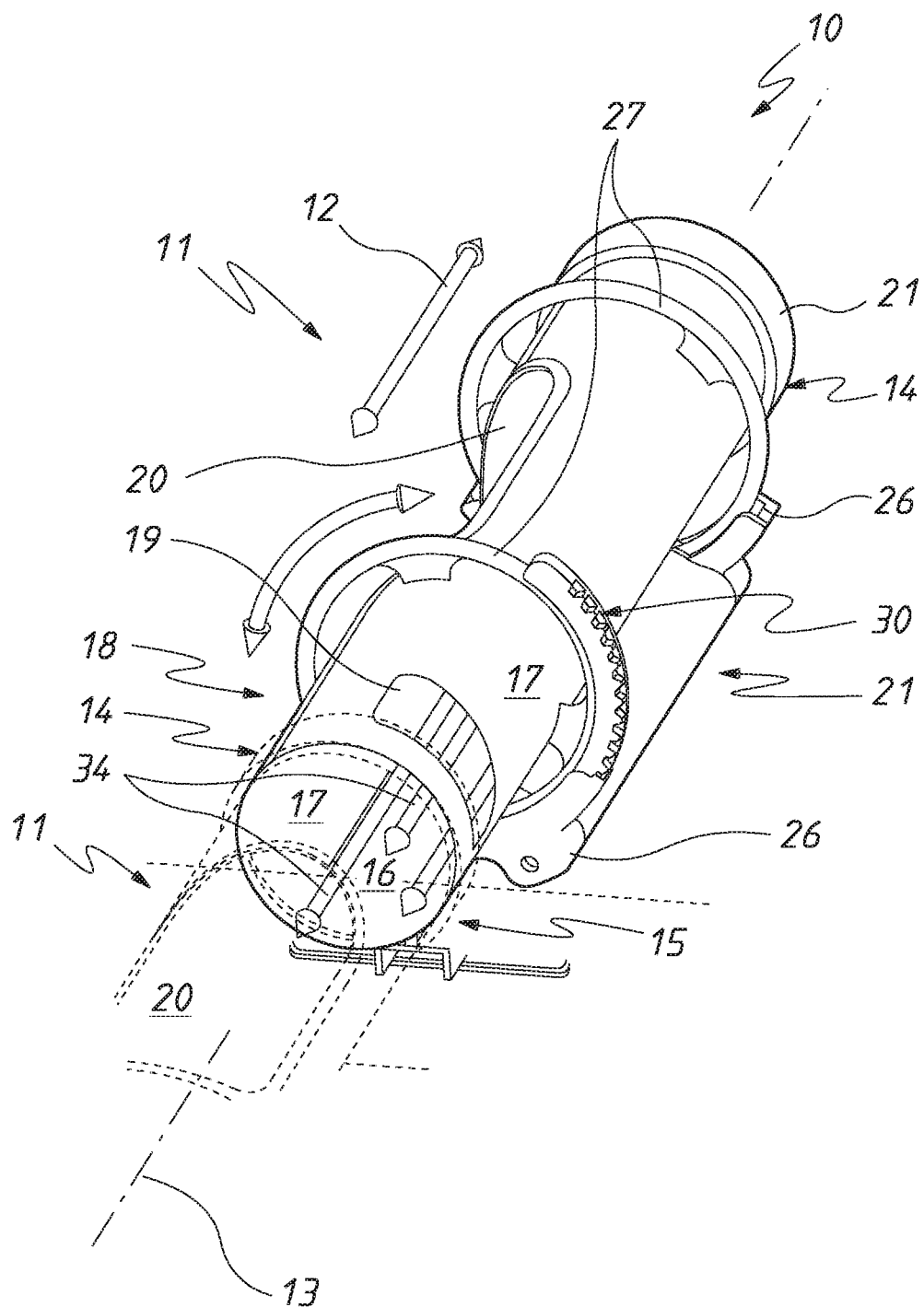
FIG. 1 is a schematic isometric view of a slip conveyor.
Figure 2:
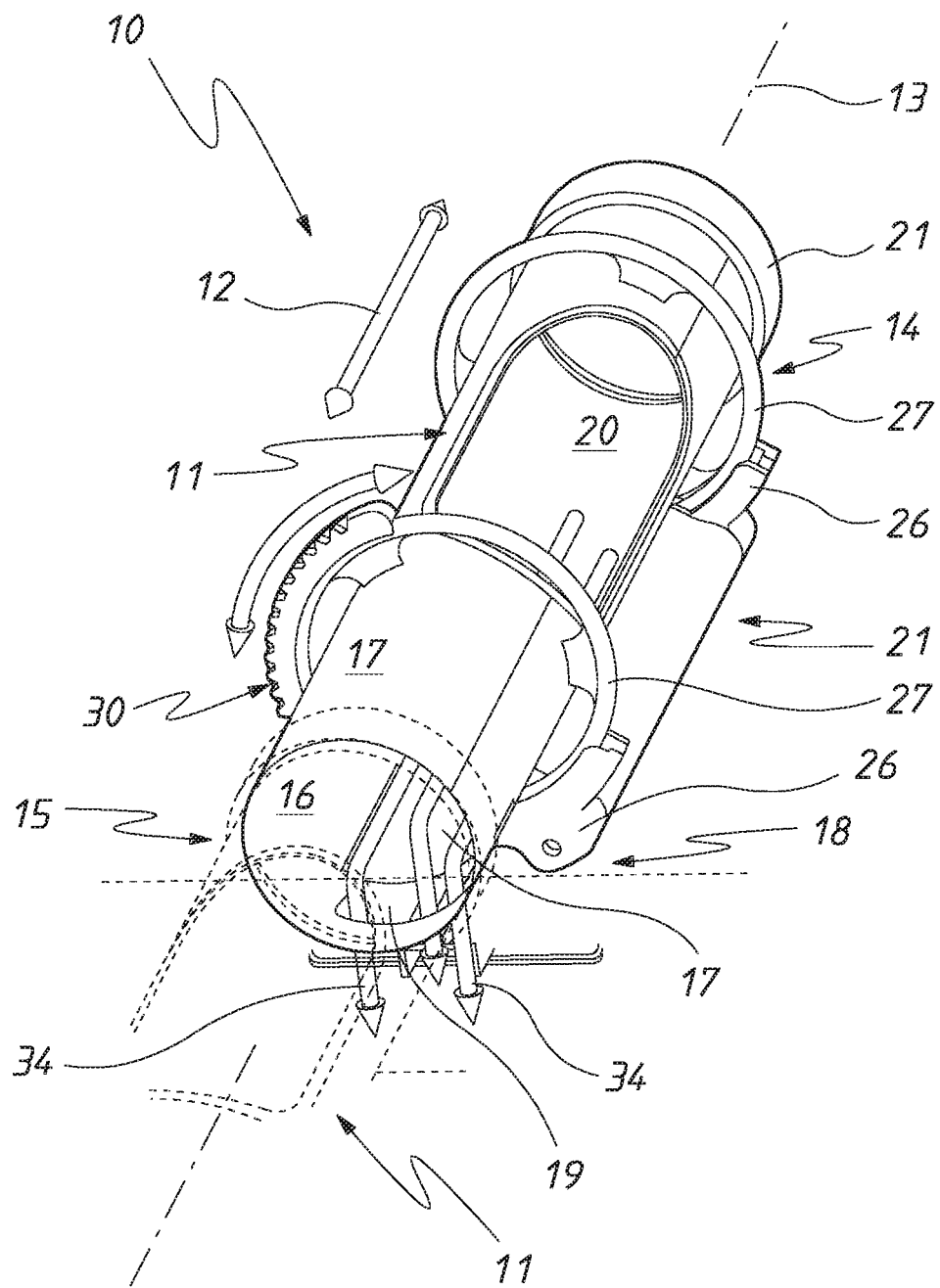
FIG. 2 is a schematic isometric view of the conveyor of FIG. 1 in a second configuration.
Figure 3:
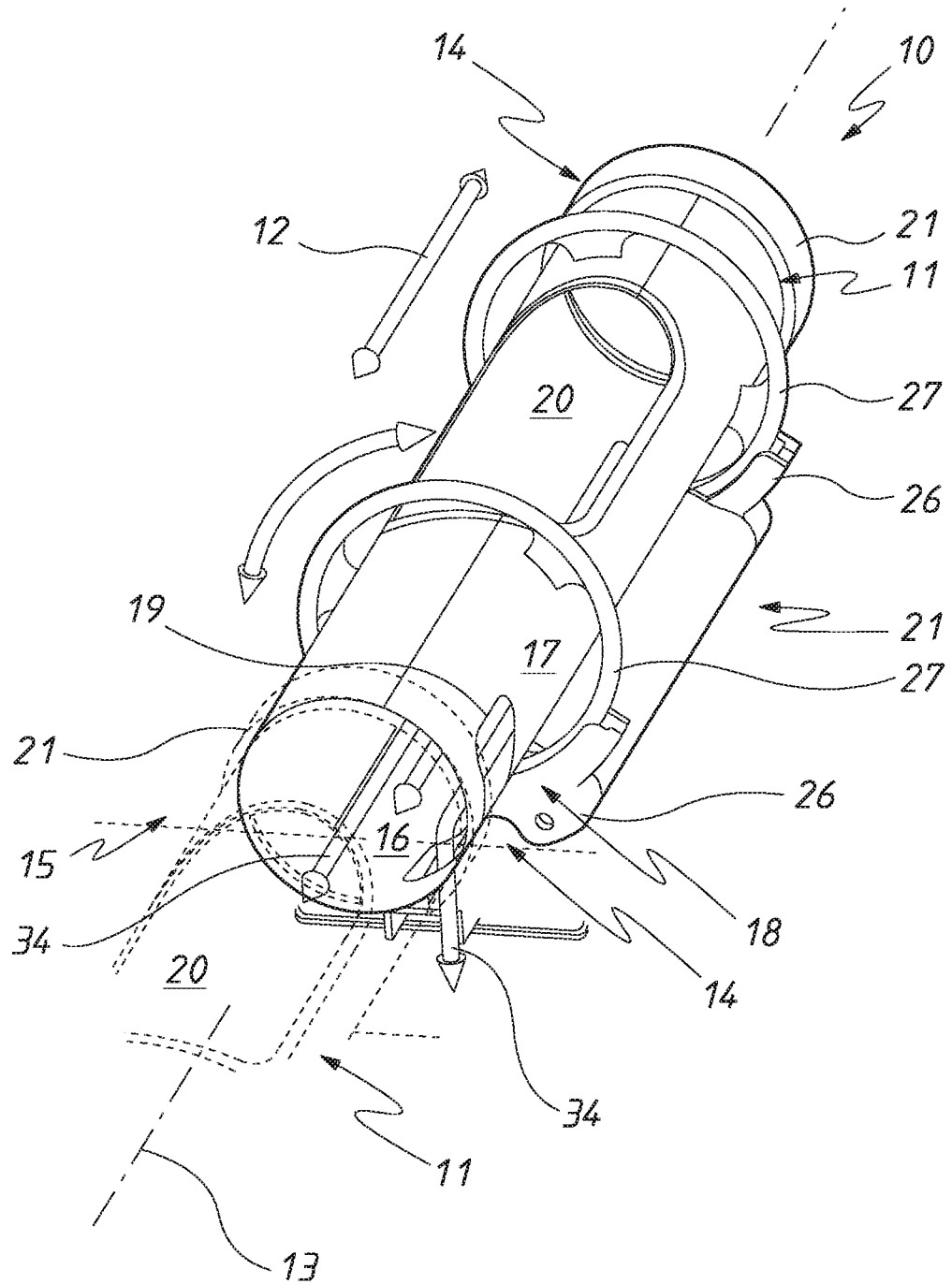
FIG. 3 is a schematic isometric view of the conveyor of FIG. 1 in a first configuration.

In FIGS. 1 to 3 of the accompanying drawings there is schematically depicted a slip (linear) conveyor 10. The conveyor 10 includes a plurality of conveyor trays 11 that convey product 34 in a downstream direction 12, from a receiving portion 14 at which product is delivered to the tray 11, to a delivery portion 15 from which product is delivered to the next downstream tray 11. Preferably the receiving portion 14 is an upstream end extremity of the tray 11. Preferably the delivery portion 15 is a downstream end extremity of the tray 11.

Each tray 11 includes a longitudinally extending base 16 along which product is conveyed from the portion 14 to be delivered from the portion 15. Extending from the base 16 is a longitudinally extending side 17. The side 17 has a delivery portion 18 from which product can also leave the tray 11. Product is delivered via the portion 18 from the tray 11 when the tray 11 is moved angularly about the axis 13 from the position as shown in FIG. 1, with the base 16 being lowermost, to the position as shown in FIG. 2 at which the side wall 17 has been moved angularly about the axis 13 so that it is the lowermost portion. More preferably, the longitudinally extending side wall 17 is a first side wall, and the tray 11 includes a second longitudinally extending side wall 17, with the base 16 located between the sides 17 so as to provide a longitudinally extending trough consisting of the base 16 and side walls 17, along which the product moves.

When the portion 18 is located as shown in FIG. 1, product is delivered from the upstream tray 11 to the next downstream tray 11 as the trays 11 longitudinally overlap.

Preferably, adjacent trays 11 overlap by the upstream tray 11 projecting internally of the next downstream tray 11 as best seen in the accompanying drawings. That is, the delivery portion 15 of the upstream tray 11 delivers product to the receiving portion 14 of the next downstream tray 11.

Preferably, each tray 11 is of a tubular configuration, and is preferably generally circular and transverse cross-section.

Preferably, the further delivery portion 18 is an aperture 19 that extends longitudinally of and angularly about the axis 13. Preferably, the aperture 19 is located adjacent but upstream of the delivery portion 15.

Preferably, each tray 11 includes an intermediate aperture 20 via which product can be delivered to each tray 11, with the aperture 20 also providing access to the interior of the tray 11 for cleaning and inspection purposes. In a further preferred embodiment, each aperture 20 may be provided with a lid (not illustrated) that provides for closing the aperture 20.

Preferably, each receiving portion 14 includes an annular flange 21 that has an internal diameter greater than the diameter of the delivery portion 15 of the next adjacent downstream tray 11 so that the delivery portion 15 can project internally of the adjacent receiving portion 14.

In respect of the above described preferred embodiment, the aperture 19 may be located so that some product is delivered from the tray 11 via the aperture 19, while product is also delivered to the delivery portion 15, as shown in FIG. 3. The relative portions delivered by the aperture 19 and delivery portion 15 can be adjusted by angular movement of the tray 11 about the axis 13.

In the embodiment of FIGS. 1 to 3, each tray 11 of the conveyor 10 is provided with a drive assembly 21. The drive assembly 21 includes a base 22 that would be fixed stationary to a supporting structure. Mounted on the base 22 are rails or guides 23 that extend longitudinally parallel to the axis 13 and provide for the longitudinal reciprocation of each tray 11 in the direction 12, that is a direction parallel to the axis 13. The tray 11 is supported on mountings 26 that slidably engage the rails 23 so that the tray 11 is supported thereby.

Mounted on the base 22 is a motor 28 that is operable to cause linear movement of shafts 29 in the direction 12. The shafts 29 are fixed to the mountings 26 so as to cause movement thereof along the guides 23.

Also mounted on the base 22 is a further motor 24. The motor 24 is operable to cause angular movement of the shafts 25. The shafts 25 engage pinion gears in at least one of the mountings 26.

Fixed to its tray 11 are rings 27. The rings 27 are each supported in bearings in the mountings 26 with at least one of the rings 27 being provided with a gear 30 having gear teeth 28. The gear 28 engages the pinion gear in the adjacent mounting 26 so that the motor 24 drives the ring 27 angularly about the axis 13, this in turn causes angular movement of the tray 11 about the axis 13.

Each tray 11 passes through the associated rings 27, with the axis 13 being the centre of the rings 27.

Figure 4:
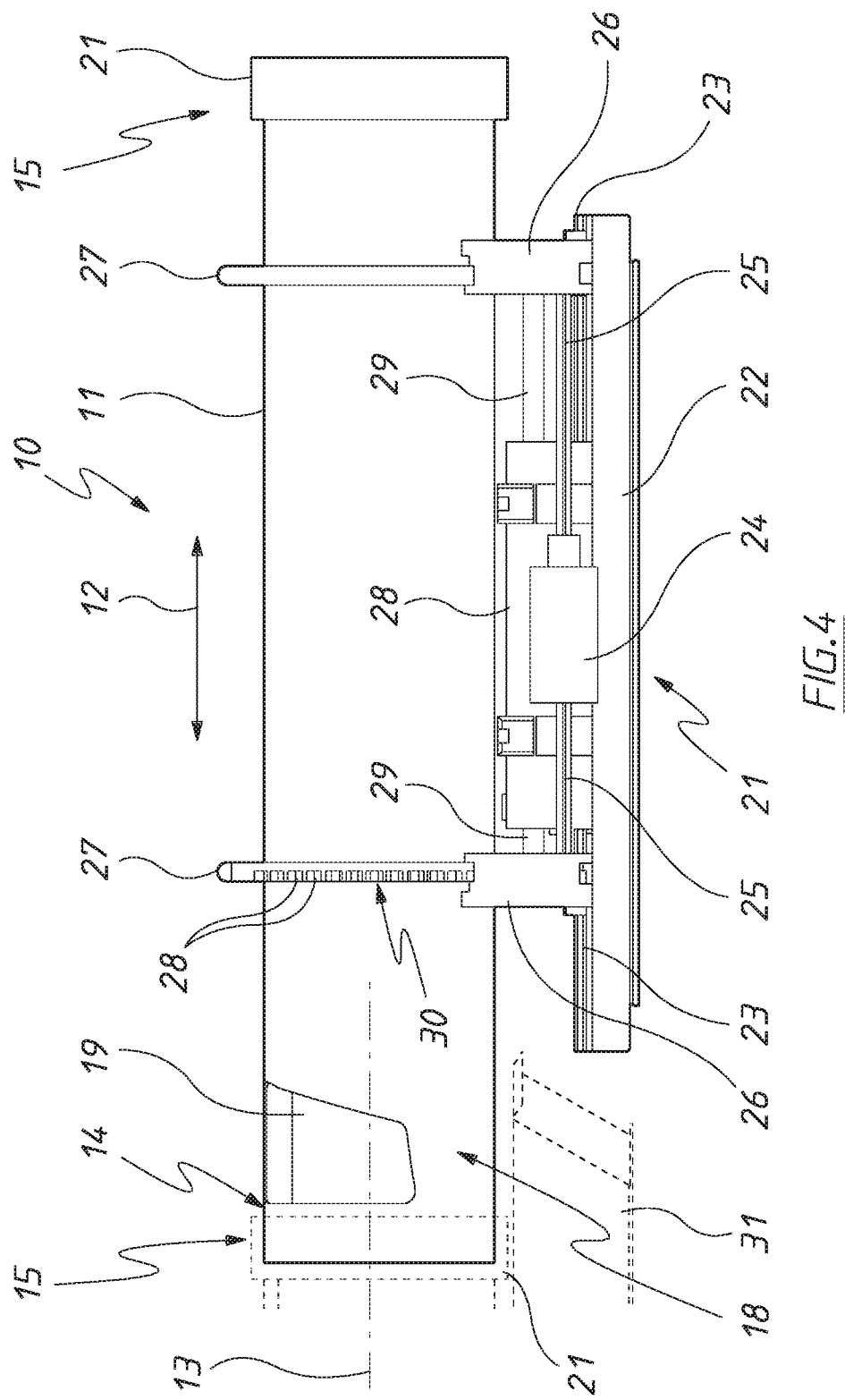
FIG. 4 is a schematic side elevation of the conveyor of FIG. 1 with a drive assembly.

As best seen in FIG. 4, when the aperture 19 is located facing generally upwardly, product is delivered from one tray 11 to the next tray 11. When the aperture 19 is moved lower, product is delivered from the aperture 19 to a piece of machinery or a further conveyor 31 located beneath the aperture 19.

Figure 5:
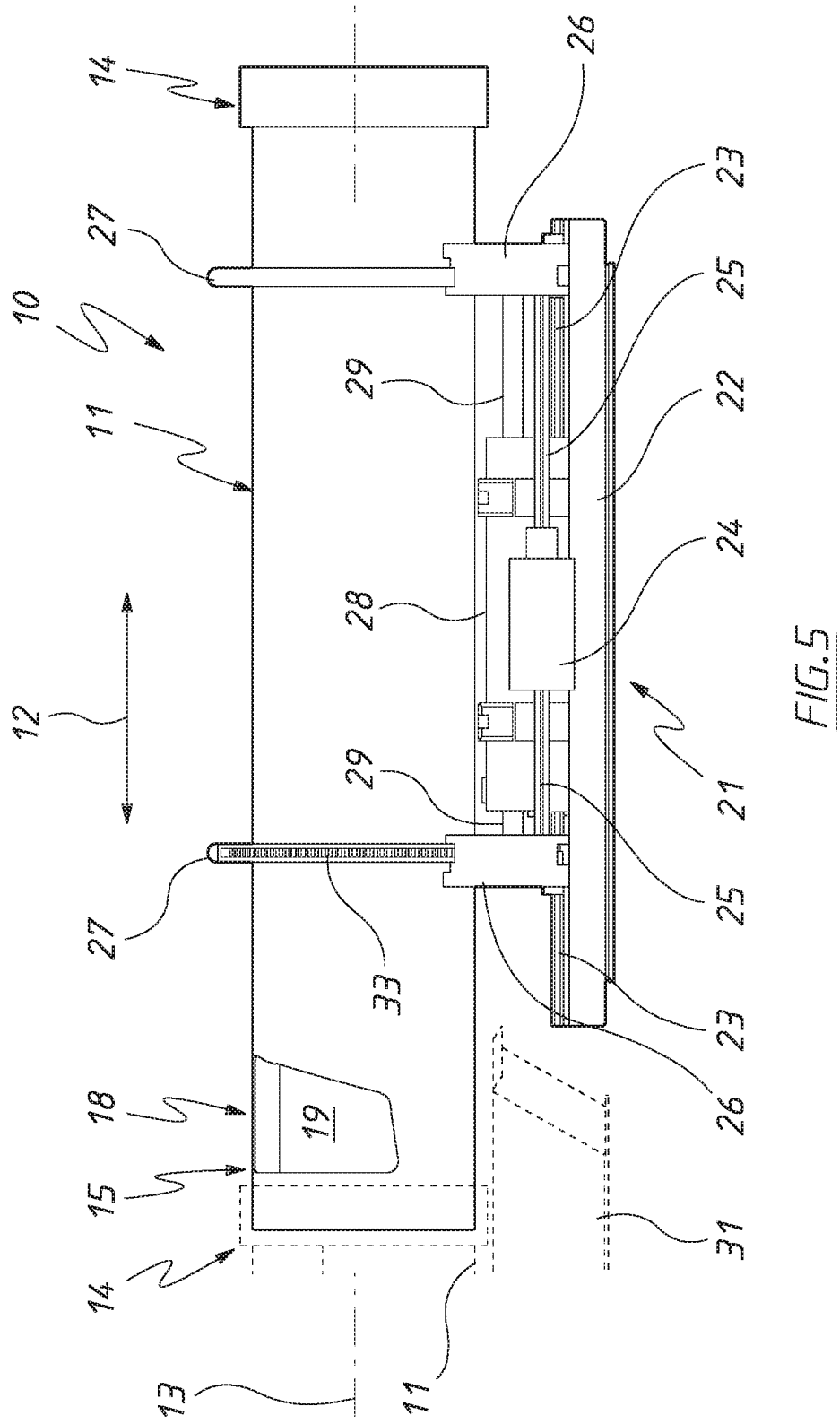
FIG. 5 is a schematic side elevation of the conveyor of FIG. 1 with a modified drive assembly.

In the embodiment of FIG. 5, the gear 30 and associated pinion gears is replaced with a drive belt 33, with the drive belt 33 having teeth that would be engaged with a pinion gear in the adjacent mounting 26.

The above described preferred embodiment has the advantage that there is no gate necessary to delivery product from the tray 11. Product is delivered from the tray 11 via the delivery portion 15 or via the delivery portion 18 when the aperture 19 is moved angularly to a lower position so that product is delivered therethrough. A further advantage is that the aperture 19 can be positioned so that only part of the product passing along the tray 11 is delivered via the aperture 19, with the remaining product being delivered by the delivery portion 15.

The above described preferred embodiment has a number of further advantages including ease of cleaning, and simplicity of structure.

The invention claimed is:

1. A slip conveyor including:
   a first conveyor tray, the first conveyor tray being longitudinally elongated and having a receiving portion that receives product that is to be conveyed longitudinally of the first conveyor tray to a delivery portion from which product is delivered from the first conveyor tray, the first conveyor tray also having a longitudinal axis about which the first conveyor tray moves angularly;
   a first drive assembly to cause longitudinal reciprocation of the first conveyor tray to cause product to move longitudinally of the first conveyor tray from the receiving portion downstream towards the delivery portion, and to move the first conveyor tray angularly about the longitudinal axis; and wherein the first conveyor tray has a longitudinally extending base that extends from the receiving portion to the delivery portion along which the product is moved when the first conveyor tray is in a first angular position, and at least one longitudinally extending side wall extending from the receiving portion to a second delivery portion from which at least some product can be delivered from the slip conveyor when the first conveyor tray is in a second angular position spaced about said longitudinal axis from the first angular position, the second delivery portion, from which at least some product can be delivered from the slip conveyor, being spaced from the receiving portion by a length less than the first delivery portion is spaced from the receiving portion;

a second conveyor tray, the second conveyor tray being longitudinally elongated and having a receiving portion that receive product that is to be conveyed longitudinally of the second conveyor tray to a delivery portion from which product is delivered from the second conveyor tray, the second conveyor tray also having a longitudinal axis about which the second conveyor tray moves angularly;

a second drive assembly to cause longitudinal reciprocation of the second conveyor tray to cause product to move longitudinally of the second tray from the receiving portion of the second conveyor tray downstream towards the delivery portion of the second conveyor tray, and to move the second conveyor tray angularly about the longitudinal axis of the second conveyor tray; and wherein the second conveyor tray has a longitudinally extending base that extends from the receiving portion of the second conveyor tray to the delivery portion of the second conveyor tray along which the product is moved when the second conveyor tray is in a first angular position, and at least one longitudinally extending side wall extending from the receiving portion of the second conveyor tray to a second delivery portion of the second tray from which at least some product can be delivered from the slip conveyor when the second conveyor tray is in a second angular position spaced about the longitudinal axis of the second conveyor tray from the first angular position of the second conveyor tray, the second delivery portion of the second conveyor tray, from which at least some product can be delivered from the slip conveyor, being spaced from the receiving portion of the second conveyor tray by a length less than the first delivery portion of the second conveyor tray is spaced from the receiving portion of the second conveyor tray;

the first and second conveyor trays being positioned with the first conveyor tray upstream of the second conveyor tray so that product can be delivered from the first conveyor tray delivery portion to the second conveyor tray receiving portion.

2. The slip conveyor of claim 1, wherein each first delivery portion of the first and second conveyor trays is an end extremity of the respective conveyor tray.

3. The slip conveyor of claim 1, wherein each receiving portion of the first and second conveyor trays is an end extremity of the respective conveyor tray.

4. The slip conveyor of claim 1, wherein each second delivery portion of the first and second conveyor trays is an aperture.

5. The slip conveyor of claim 4, wherein each aperture of the first and second conveyor trays is located adjacent but upstream of the said end first delivery portion of the respective conveyor tray.

6. The slip conveyor of claim 4, wherein each aperture of the first and second conveyor trays is a first aperture, and each of the first and second conveyor trays includes a second aperture intermediate the delivery portion and the first receiving portion of the respective conveyor tray, and spaced from the first aperture toward said receiving portion of the respective conveyor tray.

7. The slip conveyor of claim 1, wherein each longitudinally extending side wall of the first and second conveyor trays is a first side wall, and each of the first and second conveyor trays includes a second longitudinally extending side wall, with each base of the first and second conveyor trays being located between the first and second side walls of the respective conveyor tray so that the first and second side walls and base of the respective conveyor tray provide a longitudinally extending through along which the product moves.

8. The slip conveyor of claim 1, wherein each of the first and second conveyor trays are tubular in configuration.

9. The slip conveyor of claim 8, wherein at least a portion of each of the first and second conveyor trays is circular in transverse cross-section.

10. The slip conveyor of claim 1, further comprising a mounting base upon which each of the first and second conveyor trays is mounted via the respective drive assembly.

11. The slip conveyor of claim 10, wherein each drive assembly includes a first motor, the first motor being mounted on the mounting base of the respective conveyor tray and is connected to the respective conveyor tray to cause longitudinal reciprocation of the respective conveyor tray to convey product along the respective conveyor tray.

12. The slip conveyor of claim 11, wherein each drive assembly includes a second motor, the second motor being mounted on the mounting base of the respective conveyor tray and operatively associated with the respective conveyor tray to cause the angular movement of the respective conveyor tray.

13. The slip conveyor of claim 10, further comprising guides mounted on each base of the first and second conveyor trays and along which the respective conveyor tray moves to provide for the longitudinal reciprocation of the respective conveyor tray.

14. The slip conveyor of claim 1, wherein the conveyor includes at least one ring attached to each of the first and second conveyor trays and through which the respective conveyor tray passes, with the slip conveyor further including a mounting movably mounted on each of guides, and engaged with the ring to provide for angular movement of the respective conveyor tray about the respective longitudinal axis.

15. The slip conveyor of claim 2, wherein each receiving portion of the first and second conveyor trays is an end extremity of a respective conveyor tray, and each second delivery portion of the first and second conveyor trays is an aperture.

16. The slip conveyor of claim 15, wherein each aperture of the first and second conveyor trays is located adjacent but upstream of the said first delivery portion of the respective conveyor tray.

17. The slip conveyor of claim 16, wherein each aperture of the first and second conveyor trays is a first aperture, and each of the first and second conveyor trays includes a second aperture intermediate the delivery portion and the first receiving portion of the respective conveyor tray, and spaced from the first aperture of the respective conveyor tray toward the receiving portion of the respective conveyor tray.

18. The slip conveyor of claim 17, further comprising a mounting base upon which each of the first and second conveyor trays is mounted via the respective drive assembly, with each drive assembly including a first motor, the first motor being mounted on the mounting base of the respective conveyor tray and is connected to the respective conveyor tray to cause longitudinal reciprocation of the respective conveyor tray to convey product along the respective conveyor tray, and a second motor, the second motor being mounted on the mounting base of the respective conveyor tray and operatively associated with the respective conveyor tray to cause the angular movement of the respective conveyor tray.

19. The slip conveyor of claim 18, further comprising guides mounted on each mounting base and along which the respective conveyor tray moves to provide for the longitudinal reciprocation of the respective conveyor tray.

20. The slip conveyor of claim 19, further comprising at least one ring attached to each conveyor tray and through which the respective conveyor tray passes, and a mounting movably mounted on the guides of each mounting base, and engaged with the respective ring to provide for angular movement of the respective conveyor tray about the respective longitudinal axis.

21. A slip conveyor comprising:
a conveyor tray, the tray provided by a longitudinally extending tubular wall, the tray being longitudinally elongated and having a receiving portion that receives product that is to be conveyed longitudinally of the tray to a delivery portion from which product is delivered from the tray, the tray also having a longitudinal axis about which the tray moves angularly;
a drive assembly to cause longitudinal reciprocation of the tray to cause product to move longitudinally of the tray from the receiving portion downstream towards the delivery portion, and to move the tray angularly about the longitudinal axis; and wherein the tray has a longitudinally extending base that extends from the receiving portion to the delivery portion along which the product is moved when the tray is in a first angular position, and at least one longitudinally extending side wall extending from the receiving portion to a second delivery portion from which at least some product can be delivered from the conveyor when the tray is in a second angular position spaced about said longitudinal axis from the first angular position, the second delivery portion, from which at least some product can be delivered from the conveyor, being spaced from the receiving portion by a length less than the first delivery portion is spaced from the receiving portion, with the tubular wall having an aperture at said receiving portion via which product can be delivered to said base.

22. A slip conveyor comprising:
a conveyor tray, the tray being longitudinally elongated and having a receiving portion that receives product that is to be conveyed longitudinally of the tray to a delivery portion from which product is delivered from the tray, the tray also having a longitudinal axis about which the tray moves angularly;
a drive assembly to cause longitudinal reciprocation of the tray to cause product to move longitudinally of the tray from the receiving portion downstream towards the delivery portion, and to move the tray angularly about the longitudinal axis; and wherein
the tray has a longitudinally extending base that extends from the receiving portion to the delivery portion along which the product is moved when the tray is in a first angular position, and at least one longitudinally extending side wall extending from the receiving portion to a second delivery portion from which at least some product can be delivered from the conveyor when the tray is in a second angular position spaced about said longitudinal axis from the first angular position, the second delivery portion, from which at least some product can be delivered from the conveyor, being spaced from the receiving portion by a length less than the first delivery portion is spaced from the receiving portion, with second delivery portion being located closer to said delivery portion relative to said receiving portion.

23. The slip conveyor of claim 1, wherein the trays are longitudinally aligned with the first conveyor tray longitudinally overlapping the second conveyor tray.

24. The slip conveyor of claim 8, wherein the first tray projects into the second tray.

* * * * *